Patented June 14, 1932

1,863,233

UNITED STATES PATENT OFFICE

MANFRED ALIOTH, OF BASEL, SWITZERLAND, ASSIGNOR TO DURAND & HUGUENIN S. A., OF BASEL, SWITZERLAND

MANUFACTURE OF RED-ORANGE TO BROWN-RED BASIC DYESTUFFS OF THE ACRIDINE SERIES AND THE PRODUCTS

No Drawing. Application filed July 17, 1929, Serial No. 379,072, and in Germany July 28, 1928.

The present invention relates to a process for the manufacture of red-orange to brown-red basic dyestuffs.

A process for the manufacture of acridine orange (tetramethyldiaminoacridine) consists, as is known, in nitrating tetramethyldiaminodiphenylmethane to a dinitro body, reducing in this dinitro body the two nitro groups to amino groups, forming the acridine ring by heating up in an acid medium, with splitting off of ammonia, and, finally, oxidizing the leuco compound thus formed to obtain the dyestuff.

It has now been found that, with the above process in view when using a tetraalkyldiaminodiphenylmethane (wherein alkyl means a methyl or an ethyl group) as starting material, one can obtain dyestuffs of other shades if more nitric acid is employed than is necessary for the formation of a dinitro body. The quantity of this nitric acid in excess may vary between certain limits, that is to say the nitric acid may be used in a proportion of more than two molecules, but not exceeding four molecules for one molecule of the methane body.

Thus, for example, 1 molecule of tetramethyldiaminodiphenylmethane can be treated with 4 molecules of nitric acid (i. e. 2 molecules of nitric acid as in the manufacture of acridine orange and 2 molecules of nitric acid in excess) in the form of mixed acid and the reaction mass be poured into ice-water. It is believed, that in this action of nitric acid on tetramethyldiaminodiphenylmethane—like in the manufacture of acridine orange — dinitrotetramethyldiaminodiphenylmethane is formed in the first line and that afterwards the nitric acid present in excess becomes acting thereon.

So a similar result can be obtained if dinitrotetramethyldiaminodiphenylmethane is dissolved in diluted sulphuric acid (which latter corresponds to the nitrating mixture diluted with ice-water) and 2 further molecules of nitric acid are added to this solution.

By heating up of the nitration mass diluted with ice-water, the effect of the nitric acid present in excess can partially or totally be annihilated. The shade of the dyestuff which will be obtained in this way, will be very near to that of acridine orange. For the purpose of the present invention however, such a heating up must be avoided.

As to the chemical role of this nitric acid in excess, nothing definite can be said. It is presumed that it reacts with the methyl of the dimethylamino groups, that thereby formaldehyde is formed and that the latter also takes a part in the reaction.

In every case, after diluting the nitration mass with ice-water, one reduces in the usual way, whereby, in order to obtain complete reduction, in accordance with the larger quantity of nitric acid used, a correspondingly larger quantity of reducing agent must be employed than in the case of acridine orange.

The oxidation of the leuco compound to the dyestuff is effected in the same manner as in the case of the acridine orange process.

Instead of 4 molecules of nitric acid, also 3 molecules thereof can be used (i. e. 2 molecules as in the case of the manufacture of acridine orange and 1 molecule in excess) with a similar result.

The products obtained according to the present process are basic dyestuffs, being in the form of their salts easily soluble in water. By adding alkalis to such a watery solution, the color base separates out as a red-brown precipitate. With concentrated sulphuric acid these bodies give a light yellowish color, showing a green fluorescence. They yield on tannin prepared cotton as well as without mordant, on silk valuable reddish-orange to copper-red shades. These dyestuffs withstand hydrosulphite, so that they are suitable for discharge printing.

The process is explained by the following examples without limiting it thereto:

*Example I.*—25,4 gr. of tetramethyldiamino-diphenylmethane are dissolved in 250 gr. of sulphuric acid (96%) below 30° C., and the solution is cooled down to below 0° C. While stirring, still below 0° C., so much mixed acid (mixture of nitric and sulphuric acid) is added as corresponds to 4 molecules of $HNO_3$, i. e. for instance 250 gr. of mixed acid of 10,0% $HNO_3$.

The reaction mass is stirred for 2–3 hours and during this time the temperature should be raised to above 0° C. The mass is then poured into 450 gr. of ice, and the light-yellow solution which is obtained is reduced with 100–120 gr. of zinc dust below 35° C.

The solution is further diluted with 300 ccm. of water, and, for the purpose of ring-closing, heated up for 12–15 hours on the reflux cooler. When cooled down, the zinc residues are filtered off and the brownish yellow solution is oxidized with about 100 gr. of a 25% iron chloride solution. The brown dyestuff which is obtained, is precipitated by means of common salt, filtered, washed neutral with salt solution and dried.

There is obtained a brown powder easily soluble in water. This dyestuff gives on tannin prepared cotton red-brown, and on natural silk, copper-red shades. It withstands hydrosulphite, and is suitable for direct, as well as discharge printing on cotton and silk.

*Example II.*—25,4 parts of tetramethyldiamino-diphenylmethane are dissolved in 350 parts of sulphuric acid (96%) below 30° C., and this solution is cooled down to 0° C. Thereupon, there are added, drop by drop, at 0–5° C., 176 parts of mixed acid containing 10,7% of nitric acid corresponding to 3 molecules of nitric acid, while stirring well, and the mass is further well stirred for 4 hours below 10° C.

The mass is then poured into 600 parts of ice, and the colorless to slightly yellow solution which is thus obtained is reduced with a mixture of 60 parts of iron shavings and 60 parts of zinc dust at 20–35° C. As a result of this reduction, the solution first turns to brown, then to red-brown, and finally becomes colorless. The solution is then heated up to 70° C. and filtered off the iron zinc residues. This filtered solution is then, for the purpose of ring-closing, heated up for 10–14 hours on the reflux cooler, and after cooling down, 80 parts of a 25% iron chloride solution are added. The same turns to reddish-brown. The dyestuff obtained is separated by means of common salt, filtered off, washed neutral with a salt solution, and dried.

The dyestuff forms a greenish-bright, brown powder, easily soluble in water. It gives, on tannin prepared cotton, copper-red dyeings and in direct printing on silk red-orange shades. The dyestuff withstands hydrosulphite.

In place of tetramethyldiaminodiphenylmethane mentioned in the above examples, the corresponding tetraethyl compound can be used with a similar result.

What I claim is:—

1. A process for the manufacture of red-orange to brown-red basic dyestuffs, being based on the ordinary acridine-orange manufacturing method, which consists in treating tetraalkyldiaminodiphenylmethane (wherein alkyl means a methyl or an ethyl group) with an excess of nitric acid, that is in a proportion of more than two molecules, but not exceeding four molecules of nitric acid for one molecule of tetraalkyldiaminodiphenylmethane, reducing the nitro compound thus obtained to the corresponding amino compound, forming the acridine ring by elimination of ammonia and finally oxidizing the leuco compound thus obtained to the dyestuff.

2. A process for the manufacture of red-orange to brown-red basic dyestuffs, being based on the ordinary acridine orange manufacturing method, which consists in first nitrating tetraalkyldiaminodiphenylmethane (wherein alkyl means a methyl or an ethyl group) to obtain a dinitro body, further treating the latter with nitric acid in a proportion not exceeding two molecules of nitric acid for one molecule of dinitro-tetraalkyldiaminodiphenylmethane, reducing the nitro compound thus obtained to the corresponding amino compound, forming the acridine-ring by elimination of ammonia and finally oxidizing the leuco compound thus obtained to the dyestuff.

3. A process for the manufacture of red-orange to brown-red basic dyestuffs, being based on the ordinary acridine-orange manufacturing method, which consists in treating tetramethyldiaminodiphenylmethane with an excess of nitric acid, that is in a proportion of more than two molecules, but not exceeding four molecules of nitric acid for one molecule of tetramethyldiaminodiphenylmethane, reducing the nitro compound thus obtained to the corresponding amino compound, forming the acridine ring by elimination of ammonia and finally oxidizing the leuco compound thus obtained to the dyestuff.

4. A process for the manufacture of red-orange to brown-red basic dyestuffs, being based on the ordinary acridine-orange manufacturing method, which consists in first nitrating tetramethyldiaminodiphenylmethane to obtain a dinitro body, further treating the latter with nitric acid in a proportion not exceeding two molecules of nitric acid for one molecule of dinitro-tetramethyldiaminodiphenylmethane, reducing the nitro compound thus obtained to the corresponding amino compound, forming the acridine ring by elimination of ammonia and finally oxidizing the leuco compound thus obtained to the dyestuff.

5. A process for the manufacture of red-orange to brown-red basic dyestuffs, being based on the ordinary acridine-orange manufacturing method, which consists in treating tetra - alkyldiaminodiphenylmethane (wherein alkyl means a methyl or an ethyl group) with an excess of nitric acid, that is in a proportion of three molecules of nitric acid for one molecule of tetraalkyldiaminodiphenylmethane, reducing the nitro compound thus obtained to the corresponding amino compound, forming the acridine ring by elimination of ammonia and finally oxidizing the leuco compound thus obtained to the dyestuff.

6. A process for the manufacture of red-orange to brown-red basic dyestuffs, being based on the ordinary acridine-orange manufacturing method, which consists in treating tetramethyldiaminodiphenylmethane with an excess of nitric acid, that is in a proportion of three molecules of nitric acid for one molecule of tetramethyldiaminodiphenylmethane, reducing the nitro compound thus obtained to the corresponding amino compound, forming the acridine ring by elimination of ammonia and finally oxidizing the leuco compound thus obtained to the dyestuff.

7. A process for the manufacture of red-orange to brown-red basic dyestuffs, being based on the ordinary acridine-orange manufacturing method, which consists in treating tetraethyldiaminodiphenylmethane with an excess of nitric acid, that is in a proportion of three molecules of nitric acid for one molecule of tetraethyldiaminodiphenylmethane, reducing the nitro compound thus obtained to the corresponding amino compound, forming the acridine ring by elimination of ammonia and finally oxidizing the leuco compound thus obtained to the dyestuff.

8. As new articles of manufacture, the herein described red-orange to brown-red basic dyestuffs, obtained by treating tetraalkyldiaminodiphenylmethane (wherein alkyl means a methyl or on ethyl group) with nitric acid in excess, that is in a proportion of more than two molecules, but not exceeding four molecules of nitric acid for one molecule of tetraalkyldiaminodiphenylmethane, reducing the nitro body thus obtained, forming the acridine ring by elimination of ammonia and finally oxidizing the leuco compound thus formed to the dyestuff, said basic dyestuffs corresponding to the probable general formula

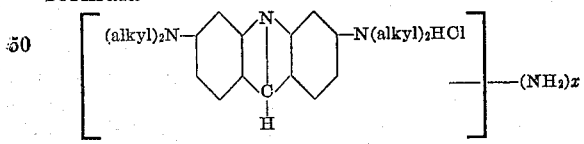

($x$ standing for 1 to 2) and constituting brown powders with greenish lustre, being in the form of their salts easily soluble in water, giving solutions from which alkalis precipitate the dyestuff-bases as red-brown powders, said dyestuffs dissolving in concentrated sulphuric acid with a light yellowish color, showing a green fluorescence, giving on natural silk and on cotton with tannin valuable red-orange to brown-red shades and being suitable for discharge printing.

9. As new articles of manufacture, the herein described red-orange to brown-red basic dyestuffs, obtained by treating tetramethyldiaminodiphenylmethane with nitric acid in excess, that is in a proportion of more than two molecules, but not exceeding four molecules of nitric acid for one molecule of tetramethyldiaminodiphenylmethane, reducing the nitro body thus obtained, forming the acridine ring by elimination of ammonia and finally oxidizing the leuco compound thus formed to the dyestuff, said basic dyestuffs corresponding to the probable formula

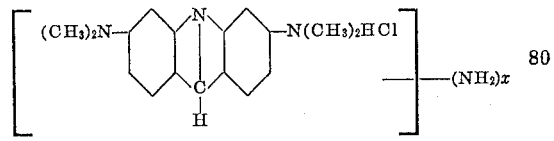

($x$ standing for 1 to 2) and constituting brown powders with greenish lustre, being in the form of their salts easily soluble in water, giving solutions from which alkalis precipitate the dyestuff-bases as red brown powders, said dyestuffs dissolving in concentrated sulphuric acid with a light yellowish color, showing a green fluorescence, giving on natural silk and on cotton with tannin valuable red-orange to brown-red shades and being suitable for discharge printing.

In witness whereof I have hereunto signed my name this 6th day of July, 1929.

MANFRED ALIOTH.